United States Patent [19]

Hoover

[11] Patent Number: 4,642,532
[45] Date of Patent: Feb. 10, 1987

[54] PROJECTION TV DEFLECTION LOSS PROTECTION CIRCUIT

[75] Inventor: Alan A. Hoover, New Palestine, Ind.

[73] Assignee: RCA Corporation, Princeton, N.J.

[21] Appl. No.: 609,413

[22] Filed: May 10, 1984

[51] Int. Cl.[4] ............................................... H01J 29/52
[52] U.S. Cl. ..................................... 315/386; 315/384
[58] Field of Search ........................ 315/411, 386, 384; 358/60, 220, 190, 243

[56] References Cited

U.S. PATENT DOCUMENTS

| | | | |
|---|---|---|---|
| 3,810,024 | 6/1974 | Meacham | 315/386 |
| 3,963,961 | 6/1976 | Ray et al. | 315/384 |
| 4,198,661 | 4/1980 | Gatten et al. | 315/386 |
| 4,297,619 | 10/1981 | Kiteley | 315/381 |
| 4,404,500 | 9/1983 | Stow | 315/386 |
| 4,521,720 | 6/1985 | Griffey | 315/386 |

Primary Examiner—Theodore M. Blum
Assistant Examiner—D. Cain
Attorney, Agent, or Firm—Paul J. Rasmussen; Joseph Laks; Scott J. Stevens

[57] ABSTRACT

A cathode ray tube protection circuit for a projection TV generates a signal which may be used to blank the tubes in response to a loss or reduction in beam deflection. Signals representative of vertical and horizontal deflection currents are provided. A reference signal is combined with the deflection representative signals to provide a signal having a predetermined amplitude. If the deflection current changes in any of the deflection yokes, the combined signal will change in amplitude. This change in amplitude is detected and used to generate a disabling or blanking signal for the kine driver circuits.

1 Claim, 1 Drawing Figure

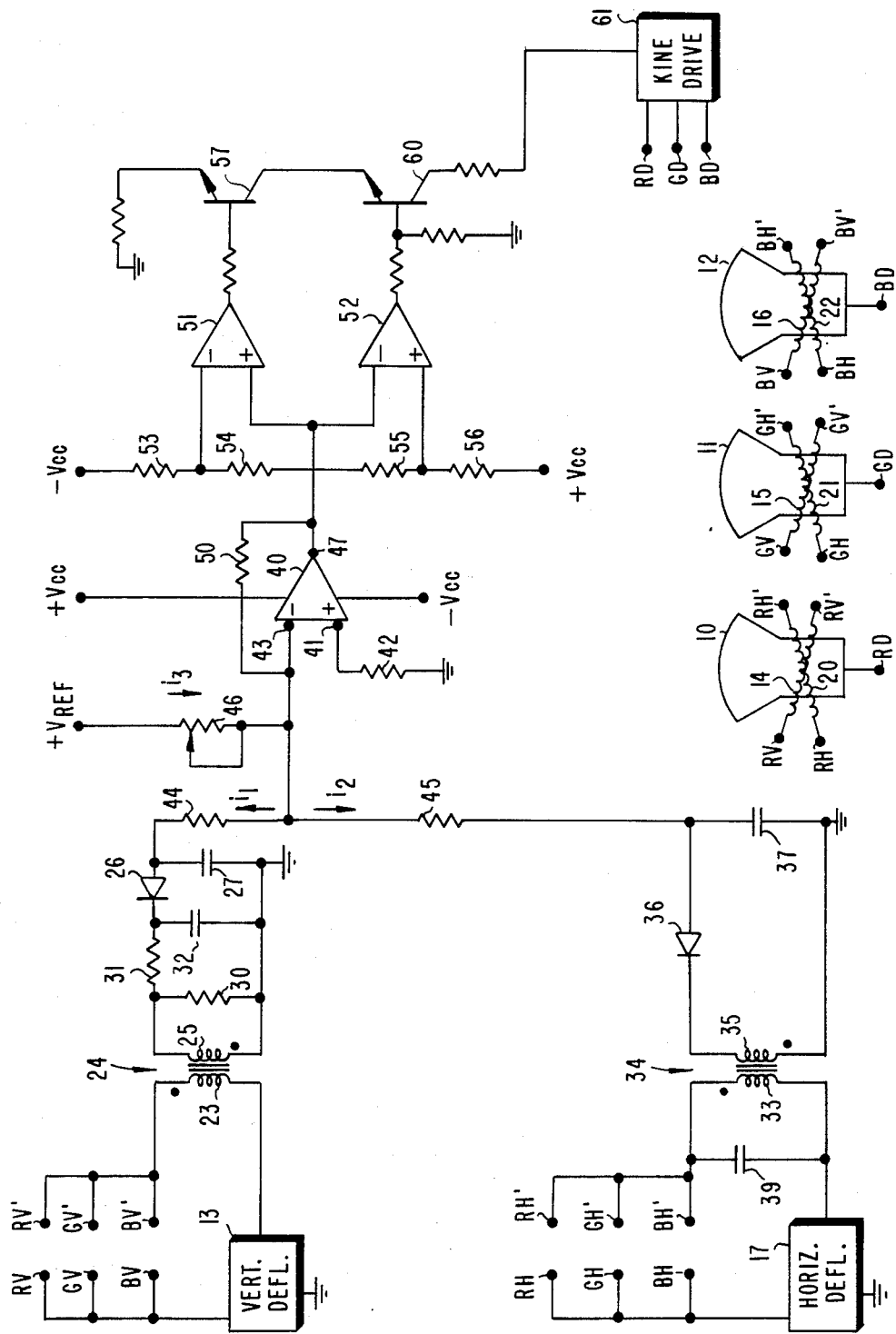

PROJECTION TV DEFLECTION LOSS PROTECTION CIRCUIT

This invention relates to projection-type video display apparatus having multiple cathode ray tubes and, in particular, to cathode ray tube protection circuits operating in response to deflection loss.

Projection video display apparatus, such as television receivers, normally include three monochrome cathode ray tubes individually producing red, green and blue images. A magnifying lens assembly is mounted to each of the cathode ray tubes and causes light from the tubes to be reflected from one or more mirrors onto the rear of a projection screen, for rear projection-type receivers. The screen transmits some of the light so that an enlarged image formed from the superimposed images from each of the cathode ray tubes is viewable from a position in front of the screen. The screen acts to diffuse the light from the tubes somewhat to increase the audience viewing angle in order to enlarge the acceptable viewing region about the front of the screen.

In order to form a final enlarged image of sufficient brightness that viewing is acceptable under normal room lighting, it is necessary that the individual cathode ray tube be operated at high brightness levels, corresponding to high levels of electron beam current density. Loss or reduction of horizontal or vertical deflection or scan of any or all of the cathode ray tube electron beams will cause an undesirable concentration of electron beam energy over a small region of the phosphor display screen of one or more of the cathode ray tubes. This may cause permanent damage to the display screen if the scan loss or reduction condition persists for even a short time. It is therefore important that some form of protection circuit be provided that quickly senses a loss or reduction of electron beam deflection and responds in an appropriate manner, such as by blanking the electron beam or beams, to prevent damage to the cathode ray tubes.

In accordance with the present invention, a projection type video display apparatus has multiple cathode ray tubes with a deflection yoke mounted on each tube. A protection circuit for the video display apparatus comprises circuitry coupled to the deflection yoke for providing a first signal having an amplitude indicative of normal line rate deflection. Circuitry is also coupled to the yokes for providing a second signal having an amplitude indicative of normal field rate deflection. A circuit, which includes circuitry that provides a reference signal, combines the first, second and reference signals to form a third signal. The third signal has a resultant amplitude of a predetermined level during normal line and field rate deflection operations and a different amplitude during abnormal deflection operation. A circuit responds to the third signal and generates a disabling signal for the video display apparatus when the amplitude of the third signal is different than the predetermined level.

In the accompanying drawing, the sole FIGURE is a block and schematic diagram of a portion of a projection-type video display apparatus incorporating a protection circuit in accordance with the present invention.

Referring to the FIGURE, a projection-type video display apparatus, such as a television receiver, incorporates three monochrome kinescopes 10, 11 and 12. Kinescope 10 illustratively produces red images, kinescope 11 produces green images, and kinescope 12 produces blue images. A field rate, or vertical deflection circuit 13 produces vertical deflection drive signals at terminals RV—RV', GV—GV' and BV—BV', which are applied to vertical deflection yokes 14, 15 and 16 located on kinescope 10, 11 and 12, respectively. Appropriate vertical deflection currents flow in yokes 14, 15 and 16. A line rate, or horizontal deflection circuit 17 generates horizontal drive signals at terminal RH—RH', GH—GH' and BH—BH', which are applied to and produce horizontal deflection currents in horizontal deflection yokes 20, 21 and 22, respectively.

The vertical deflection yoke conductor is returned to vertical deflection circuit 13 via a primary winding 23 of a transformer 24. The polarity of primary winding 23 and secondary winding 25 is such that a negative voltage pulse is produced across winding 25 during the vertical retrace interval. This pulse is rectified by diode 26 and filtered by capacitor 27, resulting in a current flow $i_1$ as shown. Resistor 30 damps the ringing of horizontal rate pulses inadvertently coupled into transformer 24. Additional horizontal rate filtering is provided by resistor 31 and capacitor 32.

The horizontal deflection yoke conductor is returned to horizontal deflection circuit 17 via a primary winding 33 of a transformer 34, which is connected across an S-shaping capacitor 39. The polarity of the secondary winding 35 is such that negative voltage pulses are produced in response to the horizontal rate parabolic waveform produced across capacitor 39. These pulses are rectified by a diode 36 and filtered by a capacitor 37 resulting in a current $i_2$ which flows as shown in the FIGURE.

Operational amplifier 40 has its noninverting input 41 coupled to ground through resistor 42. The inverting input 43 is coupled to a junction of resistors 44 and 45 and to a source of reference potential $+V_{REF}$ via a variable resistor 46, through which a current $i_3$ flows as shown. Vertical deflection representative current $i_1$ flows through resistor 44 and horizontal deflection representative current $i_2$ flows through resistor 45. Feedback from the output 47 of operational amplifier 40 to the inverting input 43 is via a resistor 50.

The output of operational amplifier 40 is coupled to the noninverting input of an operational amplifier 51 and to the inverting input of an operational amplifier 52. The inverting input of amplifier 51 and he noninverting input of amplifier 52 are coupled to the $+V_{cc}$ and the $-V_{cc}$ supplies through a resistive network comprising resistors 53, 54, 55 and 56 so that amplifiers 51 and 52, and resistors 53, 54, 55 and 56 form a voltage comparator.

The output of amplifier 51 is coupled to the base of a transistor 57 while the output of amplifier 52 is coupled to the base of a transistor 60. The collector of transistor 57 is coupled to the emitter of transistor 60. The collector of transistor 60 is coupled to circuitry 61 which controls the kinescope drivers of kinescopes 10, 11 and 12.

During normal operation of the vertical deflection circuit 13 and the horizontal deflection circuit 17, resistor 46 is adjusted so that current $i_3$ is substantially equal to the sum of currents $i_1$ and $i_2$. Therefore, the current into the inverting input 43 of amplifier 40 will be zero and the voltage at the output terminal 47 will be zero volts. The voltage at the noninverting input of amplifier 51 and the voltage at the inverting input of amplifier 52 will also be zero volts. The voltages at the inverting input of amplifier 51 will be at some level between zero and the level of the −Vcc supply, depending on the values of resistors 53, 54, 55 and 56, while the voltage at the noninverting input of amplifier 52 will be at some level between zero and the level of the +Vcc supply. The outputs of both amplifiers 51 and 52 will be near the level of the +Vcc supply so that transistors 57 and 60 are both in saturation. The collector of transistor 60 will be near ground potential resulting in kine driver circuitry 61 operating normally.

If the deflection current in any of the deflection yokes should decrease, indicating loss or reduction of deflection in one or more of the deflection yokes, the vertical or horizontal deflection representative current $i_1$ or $i_2$ will also decrease. Current $i_3$ will therefore be greater than the sum of currents $i_1$ and $i_2$ and a net current will flow into the inverting input 43 of amplifier 40. This causes the output 47 of amplifier 40 to swing to a negative potential. If this negative potential falls below the level at the inverting input of amplifier 51, the output of amplifier 51 will change to a negative value, turning off transistor 57, resulting in a high impedance path to ground, which may be utilized to disable the video display apparatus; e.g., by blanking the kinescopes, for example, via kine driver terminal RD, GD and BD.

If the deflection current in any of the deflection yokes should increase, a net current will flow out of terminal 43 of amplifier 40 and the output 47 of amplifier 40 will swing to a positive level. If this level exceeds the voltage at the noninverting input of amplifier 52, the output of amplifier 52 will go negative, turning off transistor 60, resulting again in a high impedance path to ground, which again may be utilized to disable kine driver circuitry 61.

The amount of change in the deflection yoke current necessary to cause disabling of kine driver circuitry 61 can be controlled by the voltage level applied to the inverting input of amplifier 51 and the noninverting input of amplifier 52 via the selection of resistors 53, 54, 55 and 56, or by controlling the gain of amplifier 40 via the selection of resistor 50.

What is claimed is:

1. A protection circuit for a video display apparatus having a cathode ray tube with a deflection yoke mounted thereon, said protection circuit comprising:

means coupled to said deflection yoke for providing a first current having an amplitude indicative of line rate deflection current through said deflection yoke;

means coupled to said deflection yoke for providing a second current having an amplitude indicative of field rate deflection current through said deflection yoke, current summing means for combining said first and said second currents with a reference current to form a balanced current sum signal, said reference current selected such that the amplitude of said balanced current sum signal is substantially zero as an indication of normal line and field rate deflection current in said deflection yoke and nonzero as an indication of abnormal line or field rate deflection current in said deflection yoke;

comparator means having an input terminal coupled to said balanced current sum signal providing means, said comparator responsive to said balanced current sum signal for providing a nonzero output signal as an indication of abnormal line or field rate deflection current; and means responsive to said nonzero comparator output signal for providing a disabling signal for said video display apparatus.

* * * * *